United States Patent
Sato

(10) Patent No.: US 7,191,681 B2
(45) Date of Patent: Mar. 20, 2007

(54) OPERATING PEDAL SUPPORTING DEVICE IN AUTOMOBILE

(75) Inventor: Jun Sato, Tochigi (JP)

(73) Assignee: F. Tech Incorporation, Saitama (JP)

( * ) Notice: Subject to any disclaimer, the term of this patent is extended or adjusted under 35 U.S.C. 154(b) by 375 days.

(21) Appl. No.: 10/769,984

(22) Filed: Feb. 3, 2004

(65) Prior Publication Data

US 2005/0109149 A1    May 26, 2005

(30) Foreign Application Priority Data

Nov. 21, 2003   (JP) ............................. 2003-392091

(51) Int. Cl.
  *G05G 1/14*    (2006.01)
  *B60K 28/10*   (2006.01)
(52) U.S. Cl. ............................ 74/512; 74/560; 180/274
(58) Field of Classification Search ................. 74/512, 74/513, 560; 180/274, 275, 335
   See application file for complete search history.

(56) References Cited

U.S. PATENT DOCUMENTS

| 5,848,558 | A | * | 12/1998 | Isono et al. .................... 74/512 |
| 5,848,662 | A | * | 12/1998 | Sakaue ........................ 180/274 |
| 6,408,711 | B1 | | 6/2002 | Mizuma et al. |
| 6,499,376 | B2 | * | 12/2002 | Thistleton et al. ............. 74/512 |
| 6,742,411 | B2 | * | 6/2004 | Aoki et al. .................... 74/512 |
| 6,752,038 | B2 | * | 6/2004 | Cordero ....................... 74/512 |
| 6,810,766 | B2 | * | 11/2004 | Mizuma ....................... 74/512 |
| 2003/0019319 | A1 | | 1/2003 | Mizuma |
| 2003/0029267 | A1 | | 2/2003 | Aoki et al. |
| 2005/0050980 | A1 | * | 3/2005 | Park ........................... 74/512 |
| 2005/0188781 | A1 | * | 9/2005 | Suzuki ......................... 74/512 |

FOREIGN PATENT DOCUMENTS

| EP | 0 827 885 A1 | 3/1998 |
| EP | 1 253 051 A1 | 10/2002 |
| JP | 60-261774 | 12/1985 |
| JP | 2002-087227 | 3/2002 |
| JP | 2002-087228 | 3/2002 |
| JP | 2002-358131 | 12/2002 |
| JP | 2003-212101 | 7/2003 |
| WO | WO 03/045750 A1 * | 6/2003 |

* cited by examiner

*Primary Examiner*—Vinh T. Luong
(74) *Attorney, Agent, or Firm*—Arent Fox LLP

(57) ABSTRACT

An operating pedal supporting device in an automobile includes a first bracket fixedly provided at a rear face of a dashboard for supporting an operating apparatus at a front face, a second bracket fixedly provided at a strength member of a body of the automobile, a shear pin which usually connects first and second brackets to each other, but are broken when the first bracket receives excessive rearward load from a side of the dashboard, and allows rearward displacement of the first bracket, and a control lever supported at the first and second brackets via first and second pivots and supporting an operating pedal via a third pivot, and a middle portion of the operating pedal is connected to the operating apparatus. At a time of the rearward displacement of the first bracket, the operating pedal rotates so as to move a tread portion forward following swing of the control lever. Thus, kick back of the operating pedal is prevented even when the operating apparatus and the dashboard are displaced rearward by excessive load from front during operation of the operating pedal.

7 Claims, 5 Drawing Sheets

OPERATING PEDAL SUPPORTING DEVICE IN AUTOMOBILE

BACKGROUND OF THE INVENTION

1. Field of the Invention

The present invention relates to an operating pedal supporting device in an automobile, which supports an operating pedal for operating an operating apparatus mounted to a front of a dashboard of the automobile, at a rear face side of the dashboard.

2. Description of the Related Art

As an ordinary operating pedal supporting device in an automobile, there is known the one in which a negative pressure booster is mounted at a front face of a dashboard, and a brake pedal which operates this negative pressure booster via an input lever penetrating the dashboard is pivotally supported at a proper place of a body of the automobile, for example, as disclosed in Japanese Patent Application Laid-Open No. 60-261774.

In the conventional operating pedal supporting device in the automobile, when an excessive load is applied to a front face of the operating apparatus such as a negative pressure booster due to head-on collision or the like of automobiles during operation of the operating pedal by a driver, there is the possibility that the operating apparatus is displaced rearward together with the dashboard, which causes the operating pedal to kick back and exerts an impact force on the driver.

SUMMARY OF THE INVENTION

The present invention is achieved in view of the above circumstances, and has an object to provide an operating pedal supporting device in an automobile capable of preventing kick back of an operating pedal even when an operating apparatus and a dashboard are displaced rearward by excessive load from front during operation of the operating pedal.

In order to achieve the above object, there is provided an operating pedal supporting device in an automobile, which supports an operating pedal for operating an operating apparatus mounted to a front face of a dashboard of the automobile at a side of a rear face of the dashboard, comprising: a first bracket fixedly provided at the dashboard; a second bracket spaced rearward from the dashboard and fixedly provided at a strength member of a body of the automobile; impact releasing means which usually connects the first and second brackets to each other, but releases connection of the first bracket and the second bracket to release impact and allows rearward displacement of the first bracket, when the first bracket receives excessive rearward load from a side of the dashboard; and a control lever supported at the first and second brackets via first and second pivots and supporting an upper end portion of the operating pedal via a third pivot, wherein, at a time of the rearward displacement of the first bracket, the operating pedal rotates so as to move a tread portion forward following swing of the control lever.

The operating apparatus, operating pedal and impact releasing means correspond to a negative pressure booster 13, a brake pedal 28 and shear pins 21, respectively, in an embodiment of the present invention which will be described later.

In addition to the first feature, the present invention has a second feature that the impact releasing means is constructed by a shear pin for connecting connection portions placed in substantially a horizontal direction of the first and second brackets.

In addition to the first or second feature, the present invention has a third feature that a distance between a connection point connecting the operating pedal and the operating apparatus to each other and a tread portion of the operating pedal is set to be larger than a distance between the third pivot and the connection point.

According to the first feature of the present invention, when excessive load is applied to the operating apparatus from front due to a front face collision or the like of the automobile and the dashboard is displaced rearward during operation of the operating pedal, the excessive load acts on the impact releasing means, so that the first bracket is displaced rearward with respect to the second bracket and swings the control lever, whereby the operating pedal rotates to move the tread portion thereof forward following the swing. Accordingly, even during operation of the operating pedal, kick back from the operating pedal to the driver can be prevented.

According to the second feature of the present invention, the first and the second brackets can be usually connected with the shear pin simply and reliably, and when the operating apparatus and the dashboard receive excessive load from front, shearing of the shear pin releases the connection between the first and the second brackets, thereby making the rearward displacement of the first bracket occur reliably.

According to the third feature of the present invention, at the time of operating the impact releasing means, the forward moving amount of the tread portion of the operating pedal can be made sufficiently larger than the rearward moving amount of the operating apparatus, whereby kick back from the operating pedal to the driver can be prevented reliably.

DETAILED DESCRIPTION OF THE PREFERRED EMBODIMENT

An embodiment of the present invention will be explained below with reference to the attached drawings.

Figure 1:
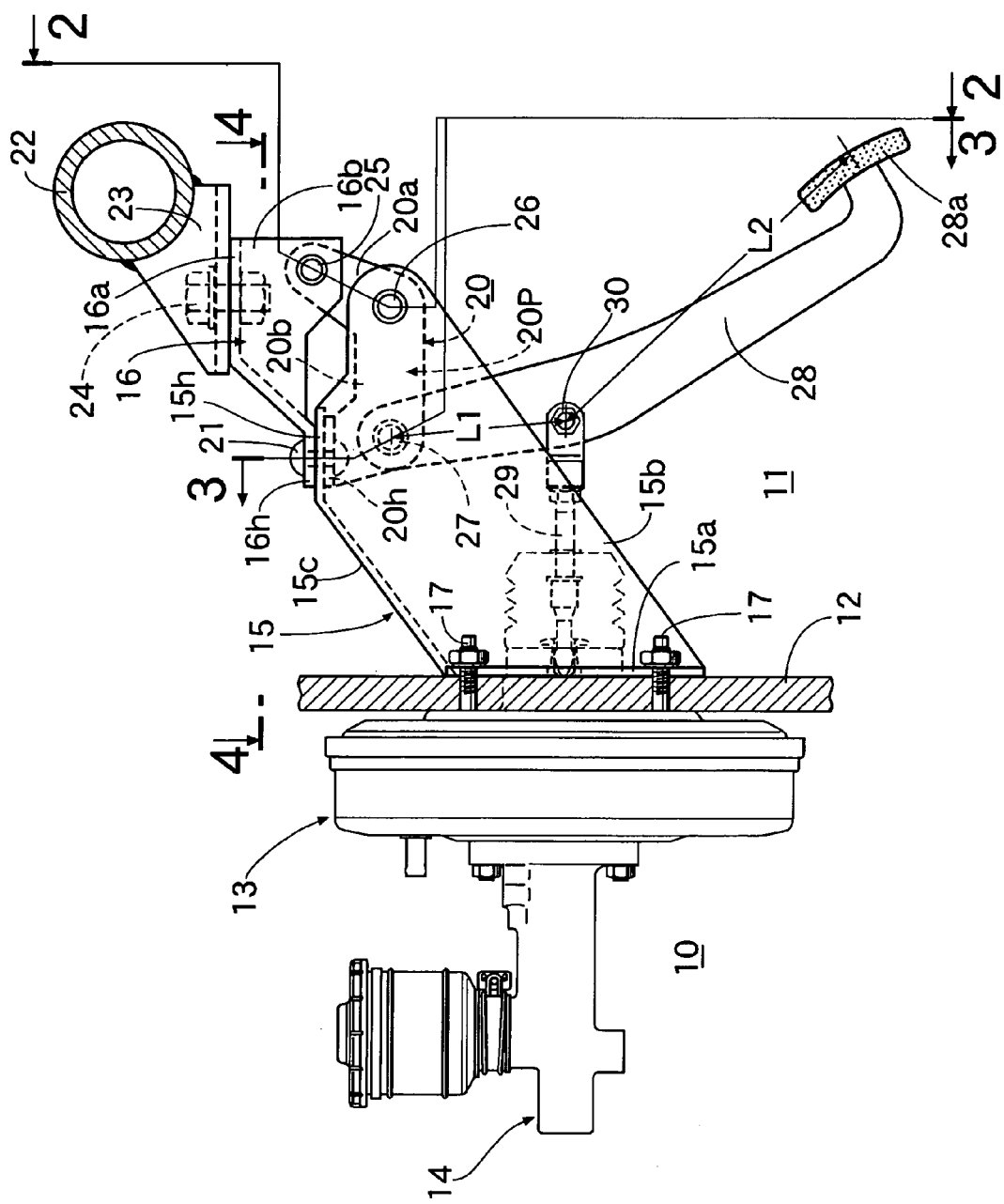
FIG. 1 is a side view of an operating pedal supporting device in an automobile according to the present invention.
Figure 2:
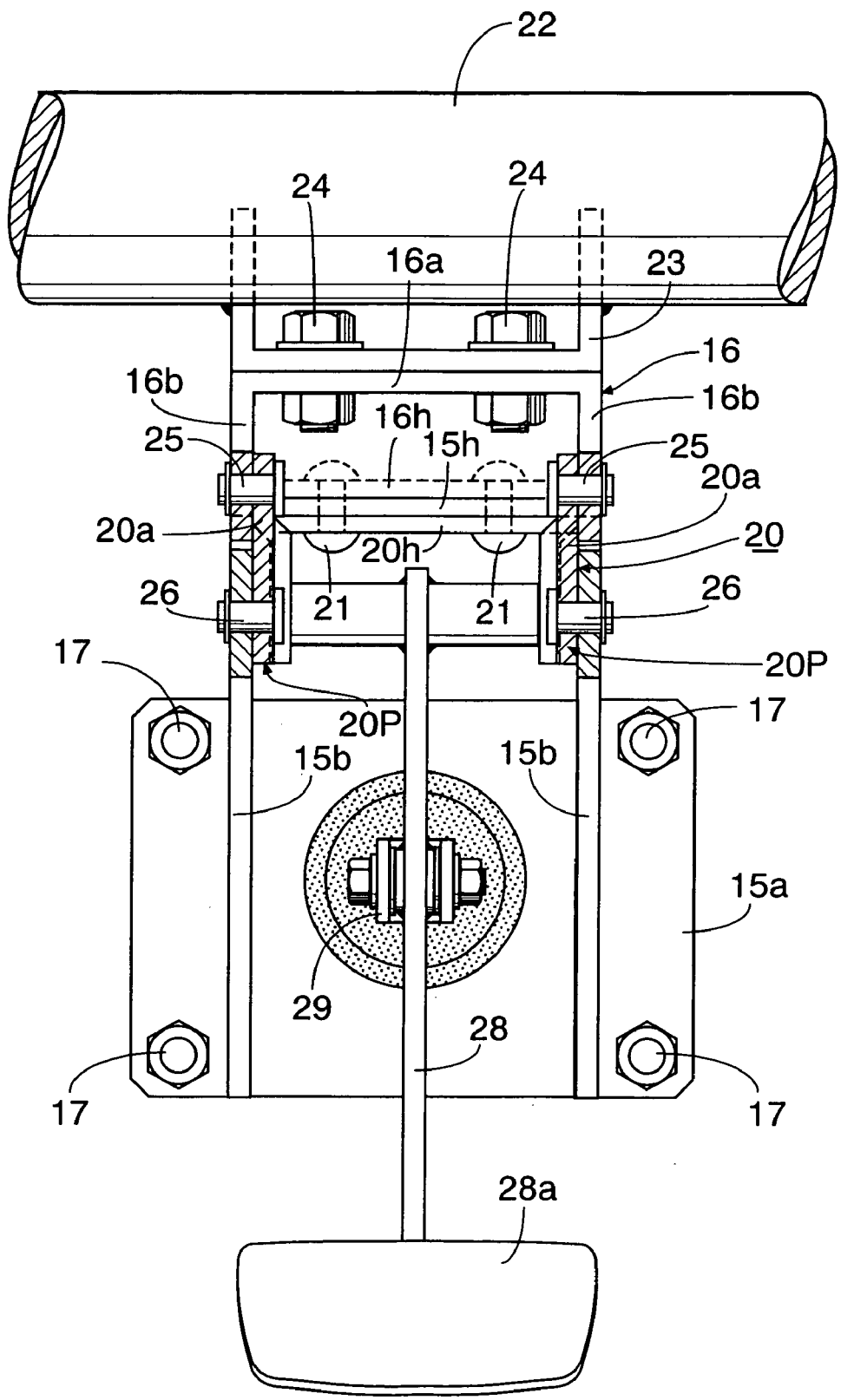
FIG. 2 is a sectional view taken along line 2—2 in FIG. 1.

First, in FIG. 1 and FIG. 2, a negative pressure booster 13 disposed in an engine room 10, and a first bracket 15 disposed in a vehicle compartment 11 are firmly fixed to a dashboard 12, which partitions the engine room 10 at a front part of an automobile and the vehicle compartment 11 at a rear part, with a plurality of bolts 17, 17 . . . . A brake master cylinder 14 which is operated with double power by the negative pressure booster 13 is mounted to a front face of the negative pressure booster 13. A hydraulic pressure conduit (not shown) connected to wheel cylinders of a front wheel brake and a rear wheel brake is connected to an output port of this brake master cylinder 14.

Figure 3:
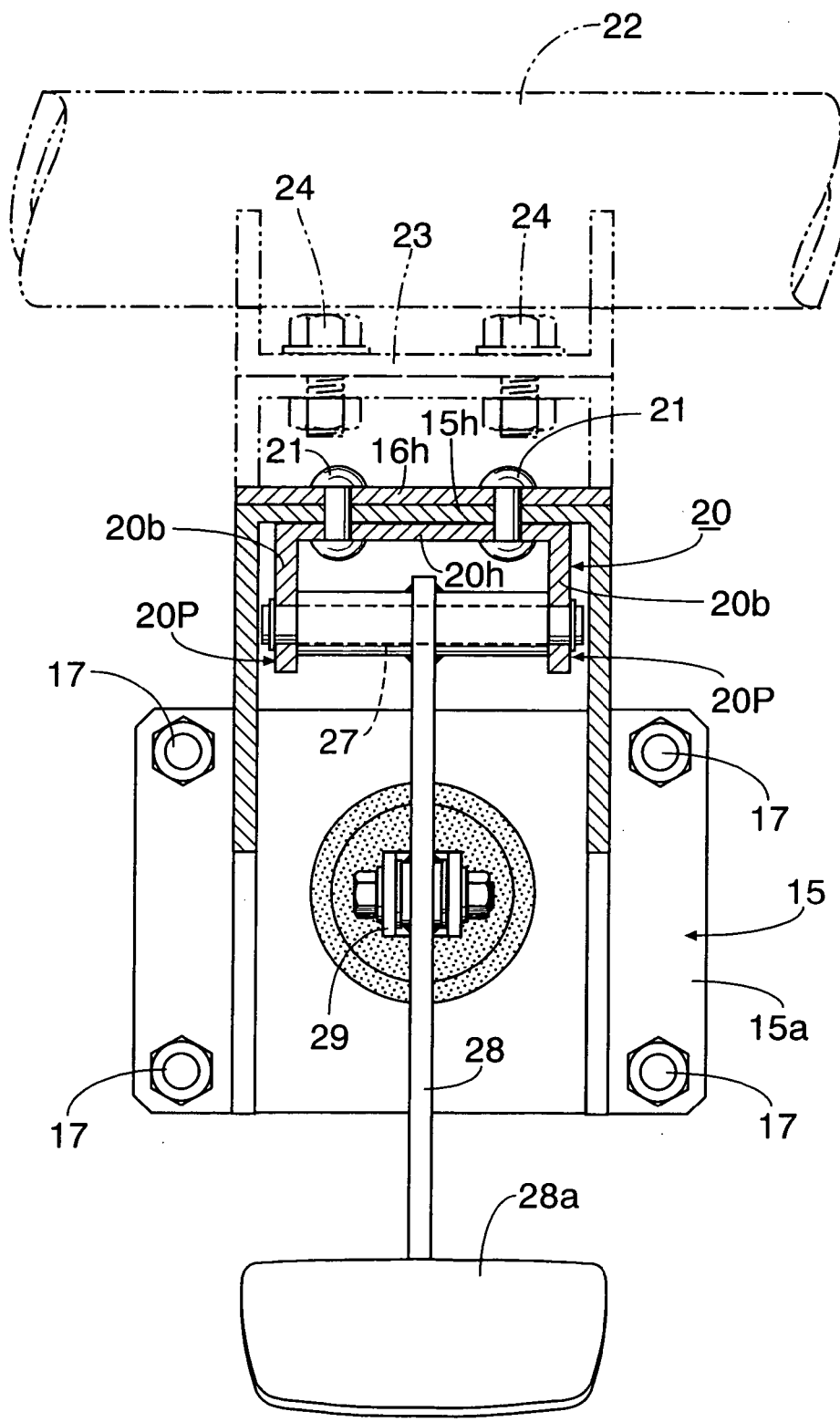
FIG. 3 is a sectional view taken along line 3—3 in FIG. 1.

As shown in FIG. 1 and FIG. 3, the first bracket 15 is constituted of a base plate 15a fixed to the dashboard 12 with the above-described bolts 17, 17 . . . , a pair of left and right side wall plates 15b and 15b projecting rearward from both left and right side portions of the base plat 15a, and a ceiling wall plate 15c integrally connecting upper ends of these side wall plates 15b and 15b; a horizontal connection portion 20h of a control lever 20 is laid on an undersurface of a horizontal connection portion 15h of the ceiling wall plate 15c, and a horizontal connection portion 16h of a second bracket 16 is placed on a top surface of the horizontal portion 15h; and these connection portions 15h, 16h and 20h are connected with one shear pin 21 or a plurality of shear pins 21 and 21. The shear pins 21 and 21 are designed to be sheared when receiving excessive load occurring at a time of impact on the front face of the automobile.

Figure 4:
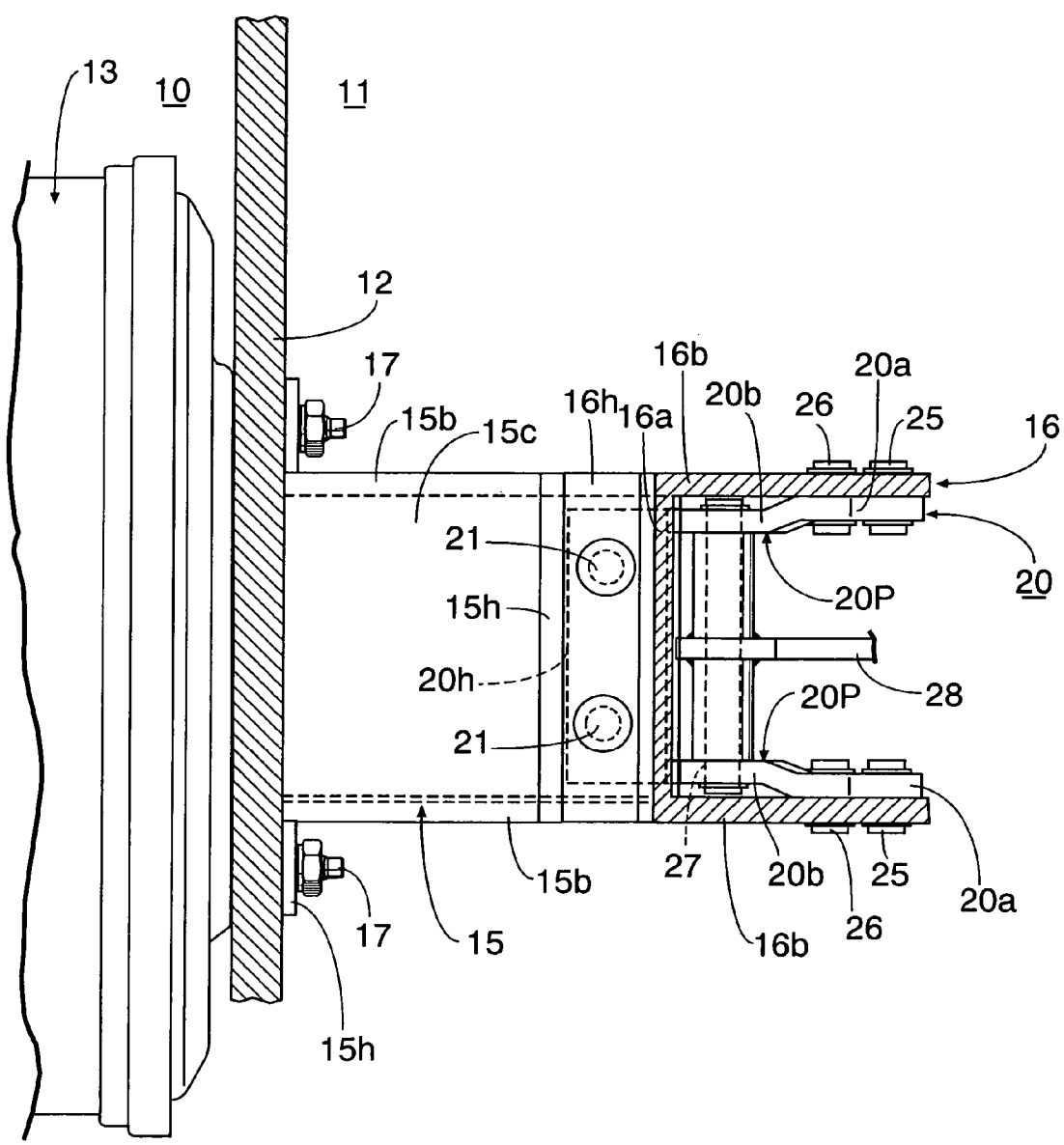
FIG. 4 is a sectional view taken along line 4—4 in FIG. 1.

As shown in FIG. 1 and FIG. 4, the second bracket 16 is constituted of a ceiling wall plate 16a connecting to the connection portion 16h, and left and right side wall plates 16b and 16b integrally connected to each other via this ceiling wall plate 16a. The ceiling wall plate 16a is firmly fixed to a support member 23 with a plurality of bolts 24. The above-described support member 23 is fixedly provided at a cross member 22 which is a strength member of the body of the automobile and is disposed in a lateral direction of the vehicle compartment 11.

As shown in FIG. 1, FIG. 2 and FIG. 4, the control lever 20 includes a pair of left and right crank-shaped arm plates 20P and 20P each constituted of a lower arm 20b horizontally disposed, and an upper arm 20a rising upward to the rear from a rear end of the lower arm 20b. The lower arm 20b is formed to be longer than the upper arm 20a. Front end portions of the left and right lower arms 20b are integrally connected to each other via the connecting plate 20h. Boarder portions of the lower and upper arms 20a and 20b of the respective arm plates 20P and 20P are rotatably mounted to the both side wall plates 15b and 15b of the first bracket 15 via first pivots 25 extending in the lateral direction of the body of the automobile. Upper end portions of the upper arms 20a of the respective arm plates 20P and 20P are rotatably mounted to the both side wall plates 16b and 16b of the second bracket 16 via second pivots 26 parallel with the first pivots 25.

Further, an upper end portion of a brake pedal 28 is rotatably mounted to tip end portions of the respective arm plates 20P and 20P via a third pivot 27. A rear end portion of the input lever 29 of the negative pressure booster 13, which penetrates the dashboard 12, is connected to a middle portion of this brake pedal 28 via a connecting shaft 30 parallel with the third pivot 27. In this structure, the second and third pivots 26 and 27 are placed on substantially the same horizontal plane. In the brake pedal 28, a distance L2 from the connecting shaft 30 to a tread portion 28a is set to be several times as long as a distance L1 between the third pivot 27 and the connecting shaft 30.

The input lever 29 is swingably connected to a control valve in the negative pressure booster 13.

Next, an operation of the embodiment will be explained.

At the time of normal operation of the automobile, when the driver presses the brake pedal 28 forward, the brake pedal 28 swings forward around the third pivot 27, and presses the input lever 29 forward, so that the negative pressure booster 13 operates the brake master cylinder 14 with double the power, whereby the brake master cylinder 14 can supply the output hydraulic pressure from its output port to the front wheel brake and the rear wheel brake, thereby operating the brakes.

AT this time, the operation reaction force of the brake pedal 28 acts on the lower arm 20b of the control lever 20 from the third pivot 27 in a direction of the second pivot 26 to cause the upper arm 20a to generate rotational force, but the rotational force is comparatively small, providing no fear of breakage of the shear pins 21 and 21. Accordingly, stepping force of the driver to the brake pedal 28 can be reliably transmitted to the negative pressure booster 13.

Figure 5:
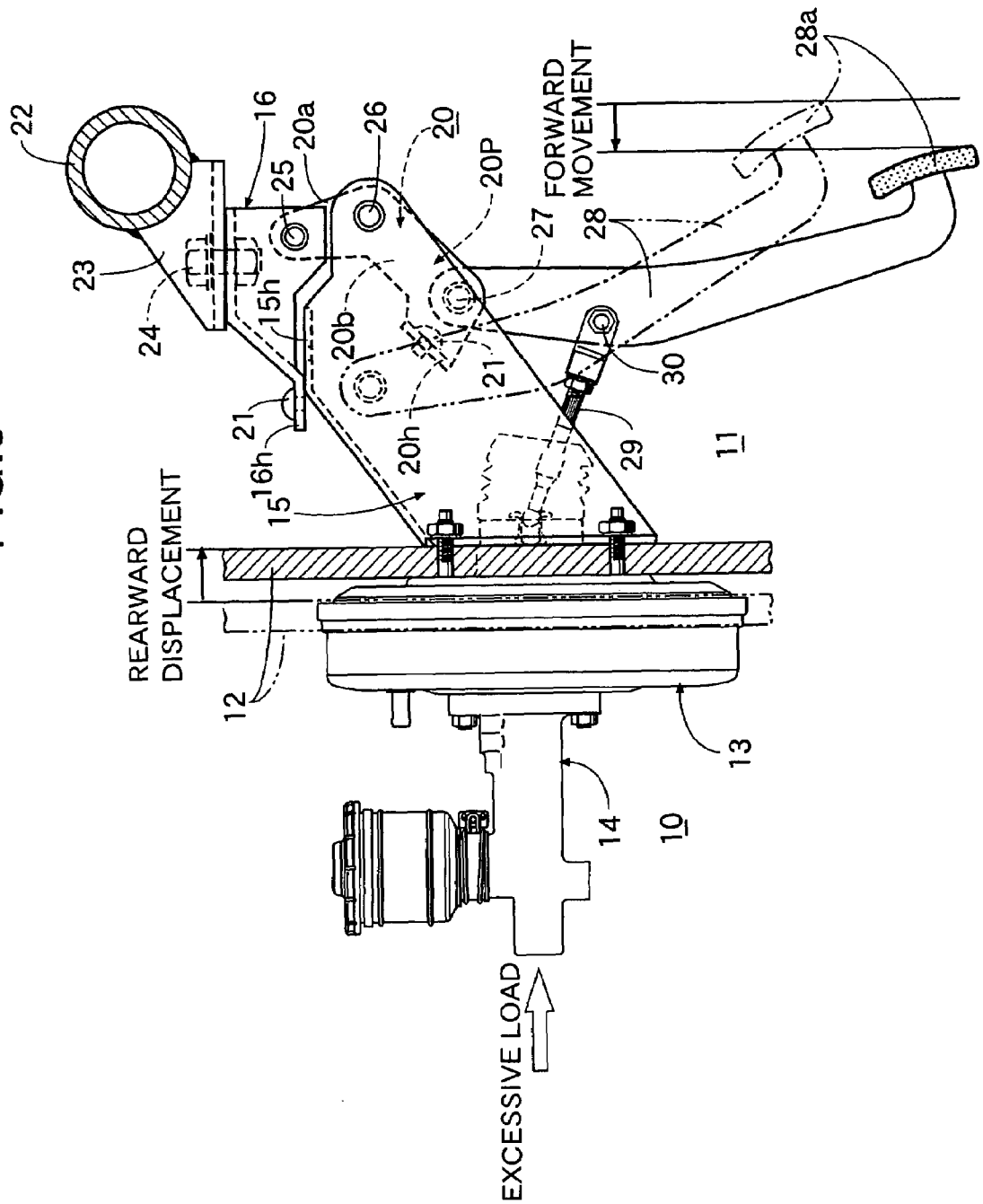
FIG. 5 is an explanatory view of an operation of the operating pedal supporting device at the time of collision of the automobile, corresponding to FIG. 1.

During the operation of the brake pedal 28 as described above, when excessive load is applied to the brake master cylinder 14 and the negative pressure booster 13 from front as shown in FIG. 5 due to the front collision or the like of the automobile so that the dash board 12 is displaced rearward, the excessive load acts on the shear pins 21 and 21 via the first bracket 15 as an excessive shearing force to break the shear pins 21 and 21. Accordingly, the first bracket 15 is displaced rearward following the breakage of the shear pins 21 and 21, but the second bracket 16 fixed to the strong support member 23 keeps the immobility state. Therefore, according to the rearward displacement of the first bracket 15, the second pivot 26 for supporting the middle portion of the control lever 20 is displaced rearward together with the first bracket 15, whereby the control lever 20 swings rearward around the first pivot 25 supported at the second bracket 16, so that the front end portion of the control lever 20 draws the upper end portion of the brake pedal 28 rearward via the third pivot 27. As a result, the brake pedal 28 rotates in the clockwise direction in FIG. 5 around the connecting shaft 30 while swinging the input lever 29 downward, to thereby move the tread portion 28a of the brake pedal 28 forward.

Especially in the brake pedal 28, the distance L2 from the connecting shaft 30 to the tread portion 28a is set to be several times as large as the distance L1 between the third pivot 27 and the connecting shaft 30. Therefore, even when the input lever 29 moves rearward together with the negative pressure booster 13, a forward moving amount of the tread portion 28a exceeds the rearward movement of the input lever 29. The position of the tread portion 28a in this case preferably moves forward from the position before the collision as in the example shown in the drawings, and it is important not to retreat at least from the position before the collision.

Thus, the driver can avoid kickback from the brake pedal 28 even during operation of the brake pedal 28.

The present invention is not limited to the above-described embodiment, and various design modifications are possible within the subject matter of the present invention. For example, the control lever 20 does not necessarily connected to the shear pins 21 and 21. Further, instead of the shear pins 21 and 21, the first and the second brackets 15 and 16 can be connected by spring members which are deformed by the excessive load. The present invention is also applicable to a clutch pedal supporting device.

What is claimed is:

1. An operating pedal supporting device in an automobile, which supports an operating pedal for operating an operating apparatus mounted to a front face of a dashboard of the automobile at a side of a rear face of the dashboard, comprising:

a first bracket fixedly provided at the dashboard;
a second bracket spaced rearward from the dashboard and fixedly provided at a strength member of the automobile;

impact releasing means configured to connect the first and second brackets to each other, but configured to release connection of the first bracket and the second bracket and to allow rearward displacement of the first bracket when the first bracket receives excessive rearward load from a side of the dashboard; and a control lever supported at the first and second brackets via first and second pivots and supporting an upper end portion of the operating pedal via a third pivot, wherein, at a time of the rearward displacement of the first bracket, the operating pedal is configured to rotate so as to move a tread portion of the operating pedal forward following swing of the control lever, and wherein the impact releasing means is a shear pin that connects connection portions placed in substantially a horizontal direction of the first and second brackets.

2. The operating pedal supporting device in the automobile according to claim 1, wherein a distance between a connection point connecting the operating pedal and the operating apparatus to each other and the tread portion of the operating pedal is set to be larger than a distance between the third pivot and the connection point.

3. The operating pedal supporting device in the automobile according to claim 1, wherein the first and second pivots pass through the first and second brackets, respectively, in supporting the control lever.

4. The operating pedal supporting device in the automobile according to claim 1, wherein said control lever includes opposing ends, and wherein said control lever is supported at one of the opposing ends at the second bracket by the first pivot and at the other of the opposing ends at an upper end portion of the operating pedal, the control lever being supported at a portion thereof intermediate the opposing ends at the first bracket by the second pivot.

5. The operating pedal supporting device in the automobile according to claim 4, wherein the control lever is formed into a crank-shape having a first arm extending between the first and second pivots and a second arm extending between the second and third pivots, the second arm being longer than the first arm.

6. The operating pedal supporting device in the automobile according to claim 5, wherein a distance between a connecting point between the operating pedal and the operating apparatus and the tread portion of the operating pedal is longer than a distance between the third pivot and the connecting point.

7. The operating pedal supporting device in the automobile according to claim 5, wherein the control lever includes a pair of plates laterally distanced from each other and said plates are each crank-shaped and connected together by a horizontal connection portion.

* * * * *